United States Patent [19]
Goerenz

[11] Patent Number: 5,462,616
[45] Date of Patent: Oct. 31, 1995

[54] PROCESS FOR PRODUCING A COMPOSITE MATERIAL COMPRISING OF AT LEAST TWO LAYERS

[75] Inventor: Edmund Goerenz, Alsdorf-Hoengen, Germany

[73] Assignee: Dyko Industriekeramik GmbH, Dusseldorf, Germany

[21] Appl. No.: 956,676

[22] Filed: Oct. 5, 1992

[30] Foreign Application Priority Data

Oct. 11, 1991 [DE] Germany ............... 41 33 712.3

[51] Int. Cl.⁶ .................................... B32B 31/00
[52] U.S. Cl. ............... 156/85; 156/182; 156/193; 156/242; 264/175; 29/428; 29/469
[58] Field of Search ............... 156/89, 193, 85, 156/192, 242; 264/175, 60; 29/428, 469

[56] References Cited

U.S. PATENT DOCUMENTS

| | | | |
|---|---|---|---|
| 3,007,222 | 11/1961 | Ragan | 25/156 |
| 3,695,960 | 10/1972 | Richter | 156/89 |
| 4,913,982 | 4/1990 | Kotchick et al. | 429/12 |
| 5,089,455 | 2/1992 | Ketcham et al. | 264/63 |

FOREIGN PATENT DOCUMENTS 0441528  8/1991  European Pat. Off. .

OTHER PUBLICATIONS

Magazine Nature, Article "A Simple Way to Make Tough Ceramics", by W. J. Clegg, K. Kendall, N. McN. Alford, T. W. Button, & J. D. Birchall, vol. 345, No. 6292, pp. 455–457, Oct. 4, 1990.

*Primary Examiner*—Christopher A. Fiorilla
*Attorney, Agent, or Firm*—Hopkins & Thomas

[57] ABSTRACT

A process for producing a composite material including at least two layers, of which at least one layer (1) is composed of ceramic material, by moistening the raw materials and aggregates for the layer (1) of ceramic material, mixing them and pressing them to form a green layer. Weak contact surfaces are formed on the green layer and the layers are pressed together to form a composite material. This is followed by drying and firing the composite material. The green layer is compacted by rollers to form the weak contact surfaces. The layers are pressed together to form the composite material by a further rolling operation.

10 Claims, 1 Drawing Sheet

PROCESS FOR PRODUCING A COMPOSITE MATERIAL COMPRISING OF AT LEAST TWO LAYERS

FIELD OF THE INVENTION

The invention relates to a process for producing a composite material comprising at least two layers, of which at least one layer is composed of ceramic material, by moistening the raw materials and aggregates, including $Al_2O_3$, SiC, and $ZrO_2$, for the layer of ceramic material, mixing them and pressing them to form a green layer, forming weak contact surfaces at the green layer and pressing the layers of the composite material together, after which the composite material is shape-consolidated by drying and firing.

BACKGROUND OF THE INVENTION

Owing, inter alia, to the brittleness of ceramic materials, the use of ceramic components composed of such materials is limited. It is therefore particularly important to improve, specifically, the mechanical properties such as strength, toughness, more favorable fracture behavior etc.

A process of the type described at the outset is disclosed by the Journal Nature, vol. 347, No. 6292, pages 455 to 467, Oct. 4, 1990: "A simple way to make tough ceramics". In this case, a composite material is produced in which first relatively thin portions are pressed out of ceramic material. These portions are formed with weak contact surfaces by covering them with, or bonding them to, graphite interlayers. The individual layers provided with the weak contact surfaces in this way are stacked one on top of the other and pressed together to form a composite material. Compared with materials of monolithic structure, the breaking strength is improved by a factor of 4 and the fracture energy is more than 100 times greater than in the case of monolithic products.

The improvement of the fracture toughness by the formation and disposal of weak contact surfaces between the individual layers of a composite material is intended to halt or deflect the propagation of cracks transversely to the main plane of extension of a composite material at each weak contact surface. The associated principles are described in detail in Refractory Materials, vol. 3, "Ceramic fibers and fibrous composite materials" by Rauch, Sutton and McCreight, Academic Press, New York and London, 1968.

US Pat. No. 3,007,222 discloses a process for the continuous production of sheet-type ceramic material, in particular in the form of tiles, heat protection layers and the like. Thus, for example, the parent body of a tile is consolidated by rolling the ceramic material. To form a layer of glaze, a further material is compacted between two rollers in their roller nip and the two layers formed in this way are brought together with low contact pressure by means of a further roller. This does not involve, however, the production of a composite material with improved fracture toughness, but it is intended to achieve as firm and permanent a joint between the layers as possible. The ceramic material for the layer forming the parent body of the tile is adjusted to a moisture content of between 8 and 15% by weight, the particle size being less than 75 μm

SUMMARY OF THE INVENTION

The object of the invention is to disclose a process of the type described at the outset with which a composite material having improved fracture toughness can be produced in a simpler manner than hitherto.

According to the invention, this is achieved in that the green layer is compacted by rolling to form the weak contact surfaces, and in that the layers of the composite material are pressed together by a further rolling operation. It is essential for the novel process that the application of the graphite interlayers is completely abandoned and the rolling of at least one ceramic layer employed in the composite material is utilized to produce or preformthe weak contact surfaces on the individual layer. The weak contact surfaces are produced as a result of the texturing of the material due to the activity of the rollers. These weak contact layers are not impaired by the further rolling operation in combining the individual layers of the composite material, but remain intact. The weak contact layers produced in this way bring about a deflection or an arrest of cracks in the composite material during corresponding stressing without the composite material being encumbered with the presence of graphite interlayers. The novel composite material can consequently be produced not only in thinner layers than in the prior art, but those layer structures are readily possible in which a graphite interlayer is not permissible. Finally, the rolling of the ceramic layer or the ceramic layers represents a very inexpensive production step without additional material being introduced into the composite material. Rolling also opens up the possibility of a continuous production process, whereas the pressing of the individual layers in the prior art is to be understood as an intermittent process. When the layers of the composite material are being pressed together, comparatively low pressing pressures can advantageously be employed in the rolling operation. Said pressures only being adjusted so that cohesion of the individual layers in the composite material is achieved.

The ceramic material of the green layer may advantageously be adjusted with a moisture content of 0 to 15% by weight, preferably of 0.5 to 8% by weight. In this connection, as dry as possible a rolling of the green layer or of the ceramic material forming the green layer is desirable because it has been found, surprisingly, that particularly high moisture contents during rolling are not necessaryto form the weak contact surfaces.

The ceramic material may be used with a bulk density of not less than 1.3 $g/cm^2$ with a particle size of 0–1 mm. The higher the bulk density is, the better is the compacting effect on the layer during rolling.

The green layer can be rolled with a higher pressing pressure than is used in pressing the layers together to form the composite material. This ensures that the weak contact surfaces produced during the rolling of the individual layers are not damaged or otherwise impaired when combined to form the composite material.

Advantageously, it is possible to bring together a plurality of green layers which have been produced in the manner described, it being possible to bring together layers of the same material and/or layers of different material. This makes it possible to achieve specific effects and properties. If layers of different materials are used, it is possible, for example, to dispose corrosion-susceptible layers in the interior of the layer structure of the composite material, whereas layers which are composed purely of ceramic material and are consequently not susceptible to corrosion can be placed on the outside as top layers.

The layers can be combined with a reduction in the layer thickness. This reduction in the layer thickness is due to the pressing in the further rolling operation, but is such that the weak contact surfaces are not impaired.

It is also possible to introduce a layer composed of a metal foil, of a fabric or of fibers into the composite material, that is to say to employ it in addition to at least one layer of ceramic material. Different properties of the composite material can be achieved depending on where these additional layers are disposed. The fibers used are preferably endless fibers which can be introduced particularly advantageously by the process step of rolling.

It is also possible to use a plurality of layers comprising two components each are combined in a structure such that one component decreases layer by layer in its quantitative proportion, whereas the proportion of the other component increases quantitatively at the same time. In this way, adjacent layers are produced which behave similarly, for example, even in relation to their thermal expansion behavior, so that it is ultimately possible to combine in this way two components which have very different thermal expansion behavior. Here, again, use is made of the formation of weak contact surfaces by the rolling of the individual layers. In this case, too, this results in a composite material with improved fracture toughness.

It is possible to press the layers of the composite material together at elevated temperature. Here temperatures of above 100° C., for example in the order of magnitude of 400° C., can be brought into effect. The individual layers consequently acquire, during rolling, a certain plasticity which improves the formation of the weak contact layers and the subsequent pressing of the layers together to form the composite material.

A particularly advantageous production results if the layer of the green body is wound up and subdivided by a cut, and the layer portions formed in this way are pressed together by rolling. It is obvious that, with such a structure, a multiplicity of equally thick layers composed of the same material are combined to form the composite material.

In all cases, a texturing is also achieved at the same time in the region of the weak surfaces of the layers as a result of rolling the individual layers. This arrangement is also aimed at crack deflection and improving the fracture toughness.

BRIEF DESCRIPTION OF THE DRAWINGS

The invention is explained and described further by reference to the drawings and to some exemplary embodiments. In the drawings.

DETAILED DESCRIPTION

Figure 1:
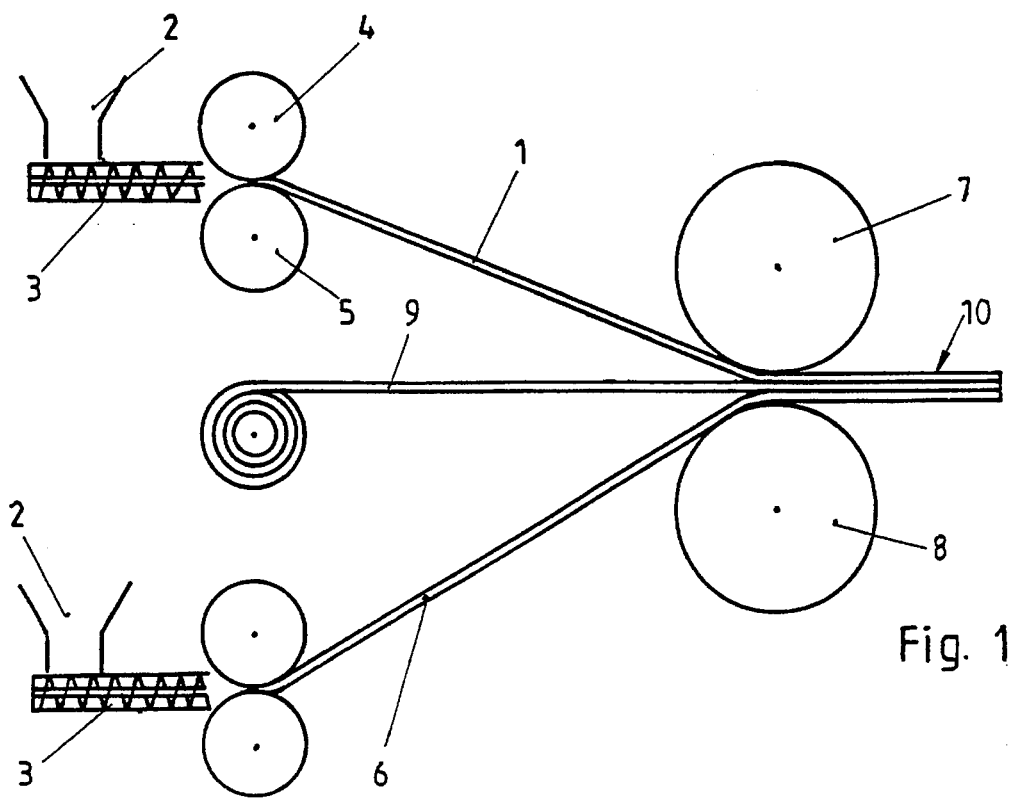
FIG. 1 shows a diagrammatic representation of the production of a composite material comprising three layers.

In FIG. 1, a first layer 1 in the form of a $Al_2O_3$ strip is first formed. For this purpose, the suitably moistened ceramic material, which can be $Al_2O_3$, SiC, and $ZrO_2$, is introduced into a filling funnel 2 and is fed to the gap of a roller nip formed by rollers 4 and 5 with the aid of a conveyor worm 3. In said roller nip, the ceramic material is compacted by the rolling operation to form a green layer, the weak contact surfaces thereby being formed on the green layer.

A layer 6, which is also produced in the same way as the layer I and generated by a rolling operation, is also fed to the roller nip of a further rolling apparatus comprising rollers 7 and 8. A metal foil 9 is fed as center layer between the two layers 1 and 6. In the roller nip of the rollers 7 and 8, the layers 1 and 6 and also the metal foil 9 are pressed onto one another and brought together in the process, thereby producing a composite material 10 in strip form which can be produced continuously, and can be appropriately cut to length in single portions and fed to a further processing stage. As a rule, the latter comprises a standard drying and firing operation.

Although FIG. 1 discloses the use of two layers 1 and 6 composed of ceramic material, it is obvious that the number of layers which are brought together to form a composite material 10 can also become comparatively large. It is quite possible, for example, to combine 30 such layers to form a composite material 10. The individual layers can be produced from identical or different material.

Figure 2:
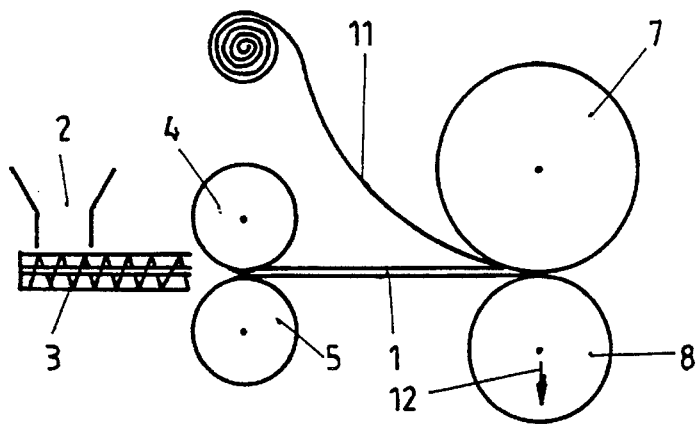
FIG. 2 shows an illustration of the formation of a plurality of layers by winding-up.

FIG. 2 illustrates a simple production possibility when it is a matter of bringing together a plurality of layers of identical material. The layer 1 is first generated as was also described by reference to FIG. 1. Additionally, a fabric web 11, for example composed of carbon fibers, can be drawn off the reel and fed, together with the layer 1, to the nip of the further rolling apparatus comprising the rollers 7 and 8. In this case, the roller 8 is movably mounted, or its movement is controlled, so that it deflects in the direction of an arrow 12, thereby enabling the web 1 and the fabric web 11 to be wound onto the roller 7 together. When the appropriate number of windings has been reached, the web wound-on can be subdivided into a multiplicity or plurality of individual portions by a cut in the radial direction to the roller 7. Depending on how the contact pressure between the rollers 7 and 8 is adjusted, the composite has under these circumstances already also been achieved at the same time by the further rolling operation or, alternatively, the portions produced by the cut are separately fed through a roller nip once again in order to achieve the cohesion of the layers in the composite material.

Figure 3:
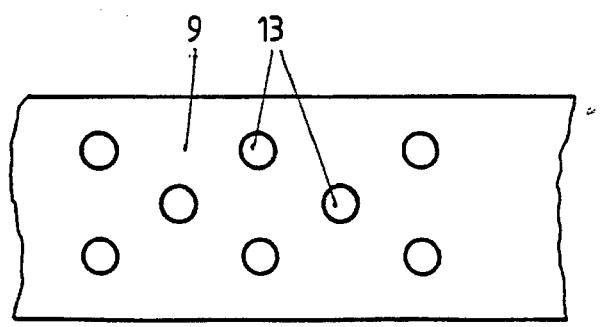
FIG. 3 shows a plan view of a perforated metal foil which, as a layer, becomes a component of the composite foil.

FIG. 3 shows a plan view of a metal foil 9 in which holes 13 are provided in a distributed manner over the surface, with the result that a plurality of layers, for example the layers 1 and 6, enter directly into a joint with one another at these points if the second rolling operation to form the composite material is carried out.

Some examples which disclose the possible modifications of the process according to the invention and the possibilities of adaptation to different requirements are further disclosed below.

EXAMPLE 1

In order to disclose a composite material which has a layer of pure ceramic material, in this instance $Al_2O_3$ in the region of its one surface and has a purely metallic layer at its other surface, six layers, 1 to 6 respectively, can be produced in each case by a rolling operation and provided with the weak contact surfaces, in which composite material the individual layers are composed of the components listed below over the thickness of the material of the composite material:

100% $Al_2O_3$+0% steel powder
80% $Al_2O_3$+20% steel powder
60% $Al_2O_3$+40% steel powder
40% $Al_2O_3$+60% steel powder
20% $Al_2O_3$+100% steel powder
0% $Al_2O_3$+100% steel powder These six layers are rolled together in a further rolling operation to form the composite material, a rolling pressure of 80 tons being used and sheets having dimensions of 50×50 $mm^2$ being capable of production in this way. The finished composite material is produced by drying and firing in an argon atmosphere.

EXAMPLE 2

Sheets having the dimension 50×1×500 mm$^3$ are rolled from an $Al_2O_3$ powder in a first rolling plant, a rolling pressure of 80 tons already being applied in this process. 16 sheets produced in this way are stacked one on top of the other and rolled together in a further rolling plant to form the composite material or the sheet of composite material. The drying is followed by a firing operation at 1600° C. Although the composite material produced in this way had a bending strength of only 75 N/mm$^2$, an improved fracture toughness compared with a monolithic structure resulted.

EXAMPLE 3

A continuous strip having the dimensions 50×1 mm$^2$ is rolled from an $Al_2O_3$ powder and, just as shown in FIG. 2, wound onto a roller 7. The winding-on is carried out under pressure in the roller nip between the rollers 7 and 8. The wound-on strip is then cut up and flattened out. If smaller dimensions are desired, it is possible to produce sheets by a punching operation, which sheets can then be in turn dried and fired. An increase in the bending strength of the composite material is also generally associated with the increase in the number of layers in the composite material.

EXAMPLE 4

Just as shown by reference to the rollers 4 and 5 in FIG. 1, two $Al_2O_3$ strips having the dimensions 50×1 mm$^2$ are rolled continuously in two roller pairs. A metal foil 9 having a wall thickness of 200 μm was introduced continuously between these two strips or layers 1 and 6. The three layers are brought together and rolled by means of a roller pair 7, 8 to form a composite material. Individual sheet-type bodies can be punched out by means of a downstreampunching apparatus. After drying and firing in an argon atmosphere at about 1350° C., a composite material with improved fracture toughness is produced. If the metal foil 9 is provided with holes 13, the two layers 1 and 6 are Joined together better and are also sintered together in the joining regions, thereby increasing the strength of the composite material 10.

EXAMPLE 5

Two layers 1 and 6 composed of SiC are rolled and brought together continuously. A center layer is produced at the same time from carbon fiber bundles. The three layers are rolled together.

EXAMPLE 6

Similarly to Example 4, two layers 1 and 6, but in this case composed of $ZrO_2$, are rolled continuously. A fabric composed of carbon fibers is introduced as the center layer.

White the preferred embodimments of the invention have been disclosed in detail, it would be understood by those skilled in the art that variations and modifications may be made without departing from the spirit and scope of the invention as set forth in the following claims.

LIST OF REFERENCE SYMBOLS

1=layer
2=funnel
3=conveyor worm
4=roller
5=roller
6=layer
7=roller
8=roller
9=metal foil
10=composite material
11=fabric web
12=arrow
13=holes

I claim:

1. A process for producing a layered composite material, comprising:
    (a) making a green layer of ceramic material by
        (i) moistening raw materials and aggregates, wherein said raw materials and aggregates are selected from one of the group consisting of $Al_2O_3$, SiC, and $ZrO_2$;
        (ii) mixing the moistened raw materials and aggregates together and forming the mixed and moistened raw materials and aggregates into a green layer of ceramic material; and
        (iii) passing the green layer of ceramic material between a pair of nip rollers to form a plurality of weak contact surfaces thereon:
    (b) passing the green layer of ceramic material and a layer of non-ceramic material between a pair of nip rollers to press the green layer of ceramic material and the layer of non-ceramic material together to form a first layer of the composite material:
    (c) forming additional layers of the composite material while quantitatively decreasing the proportion of the green layer of ceramic material and quantitatively increasing the proportion of the layer of non-ceramic material with respect to each other in each additional layer of composite material so formed;
    (d) combining said layers of composite material by rolling said layers of composite material together; and
    (e) drying the combined layers of the composite material;
    whereby, the green layer of ceramic material is decreased in its quantitative proportion with respect to the layer of non-ceramic material, while the quantitative proportion of the layer of non-ceramic material is simultaneously increased with respect to the green layer of ceramic material, from layer to layer of the composite material.

2. A process for producing a composite material made of at least two layers, comprising.
    (a) making a first green layer of ceramic material by
        (i) moistening raw materials and aggregates, wherein said raw materials and aggregates are selected from one of the group consisting of $Al_2O_3$, SiC, and $ZrO_2$.
        (ii) mixing the moistened raw materials and aggregates together and forming the mixed and moistened raw materials and aggregates into a green layer, and
        (iii) passing the green layer between a pair of nip rollers to form a plurality of weak contact surfaces thereon;
    (b) passing the first layer of ceramic material and a second layer of non-ceramic material between a pair of nip rollers to press the first and second layers together to form a layer of composite material;
    (c) winding the layer of composite material about one of said nip rollers to form the composite material;
    (d) subdividing the composite material formed on the roller with at least one cut; and
    (e) drying the composite material.

3. A process for producing a composite material from ceramic and non-ceramic materials, comprising:

(a) making a first green layer of ceramic material by
  (i) moistening raw materials and aggregates, wherein said raw materials and aggregates are selected from one of the group consisting of $Al_2O_3$, SiC, and $ZrO_2$,
  (ii) mixing the moistened raw materials and aggregates together and forming the mixed and moistened raw materials and aggregates into a green layer of ceramic material, and
  (iii) passing the green layer of ceramic material between a pair of nip rollers to form a plurality of weak contact surfaces thereon;

(b) passing the green layer of ceramic material and a second layer of non-ceramic material between a pair of nip rollers and pressing the layers together to form a layer of composite material, wherein said second layer of non-ceramic material is selected from one of the group consisting of a metal foil and carbon fibers; and (c) drying the composite material;

whereby the process yields a composite material with an improved fracture toughness resulting from the weak contact surfaces formed on the green layer of ceramic material during the process of producing the composite material.

4. The process of claim 3, wherein the green layer of ceramic material has a moisture content, and wherein the moisture content of the green layer ranges from 0 to 15% by weight.

5. The process of claim 3, wherein the ceramic material of the green layer has a bulk density of of at least 1.3 g/cm$^3$, and wherein said raw materials and aggregates comprise particles, said particles having a particle size ranging up to 1 mm.

6. The process of claim 3, wherein the rolling pressure used to press the mixed and moistened raw materials and aggregates into the green layer is higher than the amount of pressure used to press the green layer and the second non-ceramic layer together.

7. The process of claim 3, wherein step (b) further comprises the step of pressing two or more green layers together with said second layer of material.

8. The process of claim 3, wherein said composite material has a thickness, and wherein the step of drying reduces the thickness of the composite material.

9. The process of claim 3, wherein said first and second layers are pressed together at a temperature greater than 100° C.

10. The process of claim 3, wherein said second layer of non-ceramic material comprises carbon fabric.

* * * * *